United States Patent
Kumar

(12) 
(10) Patent No.: US 12,177,770 B2
(45) Date of Patent: Dec. 24, 2024

(54) SYSTEMS AND METHODS FOR MAINTAINING SEAMLESS MOBILE DATA COMMUNICATION USING INTELLIGENT WAN INTERFACE SWITCHING

(71) Applicant: GE Precision Healthcare LLC, Wauwatosa, WI (US)

(72) Inventor: Poovakkattillathu Narayanan Elayath Vineeth Kumar, Bangalore (IN)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 277 days.

(21) Appl. No.: 17/713,829

(22) Filed: Apr. 5, 2022

(65) Prior Publication Data
US 2023/0319694 A1 Oct. 5, 2023

(51) Int. Cl.
| | |
|---|---|
| *H04W 76/00* | (2018.01) |
| *H04W 4/021* | (2018.01) |
| *H04W 8/18* | (2009.01) |
| *H04W 24/10* | (2009.01) |
| *H04W 48/00* | (2009.01) |
| *H04W 60/04* | (2009.01) |
| *H04W 76/15* | (2018.01) |

(52) U.S. Cl.
CPC .......... *H04W 48/17* (2013.01); *H04W 4/021* (2013.01); *H04W 8/183* (2013.01); *H04W 24/10* (2013.01); *H04W 60/04* (2013.01); *H04W 76/15* (2018.02)

(58) Field of Classification Search
None
See application file for complete search history.

(56) References Cited

U.S. PATENT DOCUMENTS

| | | | | |
|---|---|---|---|---|
| 9,210,568 | B1 * | 12/2015 | Chang | H04W 8/245 |
| 2013/0316766 | A1 * | 11/2013 | Nousiainen | H04W 8/183 |
| | | | | 455/558 |
| 2022/0248278 | A1 * | 8/2022 | Huang | H04W 36/00222 |
| 2023/0319694 | A1 * | 10/2023 | Kumar | H04W 4/021 |
| 2024/0023005 | A1 * | 1/2024 | Wang | H04W 48/14 |

FOREIGN PATENT DOCUMENTS

CN 101064916 A 10/2007

* cited by examiner

*Primary Examiner* — Brandon M Renner
(74) *Attorney, Agent, or Firm* — Fletcher Yoder, P.C.

(57) ABSTRACT

This disclosure is directed to providing a seamless and secure connection between an electronic device (e.g., a mobile device such as a cellular phone) and a network during network switching. A device (e.g., a network interface card) may be used to hold SIM card stacks or embedded SIM (eSIM) stacks and intelligently and automatically configure network interfaces to maintain seamless and secure data link connection during network switching, thus providing the electronic device connection to networks with enhanced or optimized quality of service (QoS).

20 Claims, 7 Drawing Sheets

SYSTEMS AND METHODS FOR MAINTAINING SEAMLESS MOBILE DATA COMMUNICATION USING INTELLIGENT WAN INTERFACE SWITCHING

BACKGROUND

The subject matter disclosed herein relates to wireless communication and, more particularly, network switching during wireless communication. Electronic devices (e.g., mobile cellular devices) may establish communication with one or more networks (e.g., telecommunication service providers) using one or more subscriber identification modules (SIMs) and one or more network interfaces. An electronic device may communicate with a first network using a first network interface and a first SIM registered with the first network. A user of the electronic device may switch from communicating with the first network to communicating with a second network by switching to a second network interface and a second SIM registered with the second network.

The switch from the first network to the second network may cause a break in communication, preventing the electronic device from maintaining an uninterrupted secured channel of communication, which may negatively affect user experience with respect to using the electronic device (e.g., causing dropped calls and/or loss of or reduced data streaming capability).

BRIEF DESCRIPTION

In one embodiment, a network interface card may include a first network interface that may communicate with a first network using a first subscriber identification module (SIM) of multiple SIMs that may register with a respective network, wherein the network interface card may couple with the multiple SIMs. The network interface card may also include a second network interface that may communicate with a second network using a second SIM of the multiple SIMs, and a controller that may include a processor and a memory, wherein the memory may include a first buffer and a second buffer. The processor of the controller may establish a first connection between the first network interface and the first network by coupling the first SIM to the first network interface. The processor may establish a second connection between the second network interface and the second network by coupling the second SIM to the second network interface, and may generate a first bonded interface by coupling the first network interface to the second network interface. The processor may break the first bonded interface by decoupling the first SIM from the first network interface or the second SIM from the second network interface based on a performance of the first network or the second network. The processor may establish a third connection between the first network interface and a third network by coupling a third SIM of the plurality of SIMs to the third network interface, and may generate a second bonded interface by recoupling the first network interface to the second network interface.

In another embodiment, a method may include determining, via a processor, a set of performance metrics for each network of a set of networks; generating, via the processor, a bonded interface that may include a first network interface that may communicate with a first network of the set of networks and a second network interface that may communicate with a second network of the set of networks, wherein the first network and the second network may be selected based on one or more of their respective performance values of the set of performance values; and communicating, via the bonded interface, with the first network, the second network, or both.

In yet another embodiment, a method may include determining, at a processor, a geographical area for one or more devices; selecting, via the processor, a first set of subscriber identification modules (SIMs) based on one or more performance metrics determined for multiple SIMs for the geographical area, wherein each SIM of the multiple SIMs may register with a respective network; and providing, via a transmitter, the first set of SIMs selected based on the one or more performance metrics to the one or more devices.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
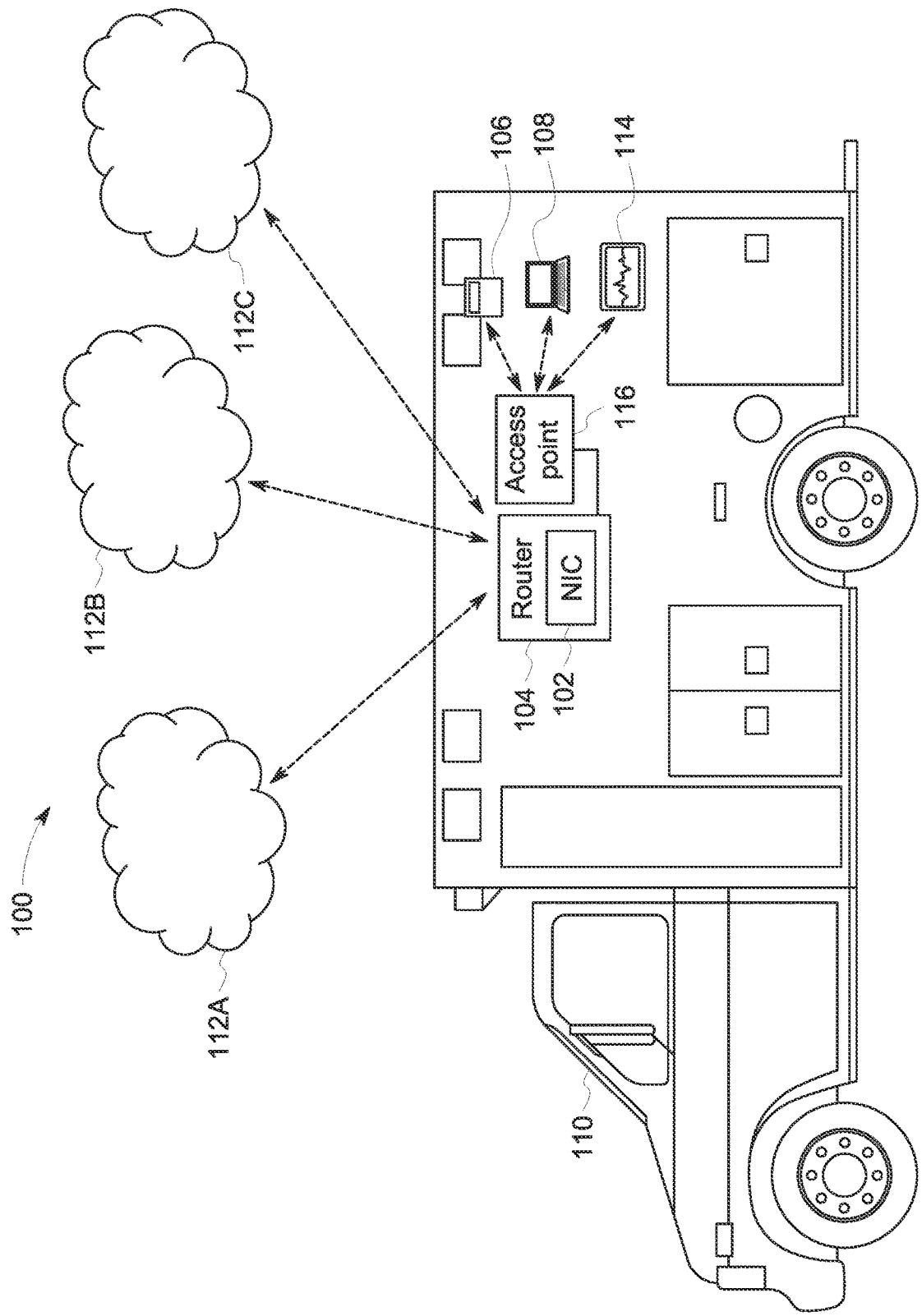
FIG. 1 is a schematic diagram of a mobile communication system for providing a seamless and secure connection between an electronic device and a network during interface switching, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

This disclosure is directed to providing a seamless and secure connection between an electronic device (e.g., a mobile device, such as a cellular phone or smartphone) and a network (e.g., a cellular or telecommunication network) during network switching. The network may implement Fourth Generation (4G)/Long-Term Evolution (LTE) and/or Fifth Generation (5G)/New Radio (NR) standards that facilitate communication with mobile devices. In certain situations, a mobile device may travel large distances, which may require switching between multiple networks (e.g., switching from a 4G network to a 5G network or vice versa) and/or between multiple networks to maintain a data link (e.g., to the Internet or a cloud-based platform or architecture). As defined herein a network may include any suitable communication network, such as a wide area network (e.g., WAN), including the Internet, that provided by a wireless telecommunication service provider (e.g., cellular carrier, such as Verizon or AT&T), that provided by a an Internet service provider (ISP) (e.g., Comcast or Spectrum), a network (e.g., a 4G network, a 5G network) provided by a wireless telecommunication service provider or an Internet service provider, and so on.

In some cases, network switching may be performed manually, and there may be one gateway interface between the mobile device and the Internet. For example, a user of the mobile device may manually select an option on the mobile device (or another electronic device communicatively coupled to the mobile device) that causes the mobile device to reconfigure its network settings and enables the mobile device to break communication with a current network with which the mobile device is currently communicating and connect to a new network with better quality of service (QoS). This manual switching may not be seamless, as it may cause an Internet service interruption for the mobile device. Performing network switching using such methods may also result in a change in network Internet Protocol (IP) addresses, which may cause a break in a secured channel of communication and packet loss due to insufficient buffering. Such disadvantages make these systems and methods of network switching unideal or suboptimal for mission critical use cases, such as encrypted data streaming, data streaming for emergency services (e.g., used in ambulances, fire engines, or other emergency vehicles), remote patient monitoring, and so on.

Embodiments herein provide various techniques for improving data link connection between a mobile device and a network during network switching. A device (e.g., a network interface card (NIC)) may be used to hold, mount, or physically couple to SIM cards or communicatively and/or electrically couple to embedded SIMs (eSIMs), and intelligently and/or automatically configure network interfaces to maintain seamless and secure data link connection during network switching, thus providing enhanced or optimized QoS.

With the foregoing in mind, FIG. 1 is a schematic diagram of a mobile communication system 100 for providing a seamless and secure connection between an electronic device and a network during network switching, according to an embodiment of the present disclosure. The mobile system 100 may include a vehicle 110 (e.g., an ambulance) having multiple Internet-dependent electronic devices connected to an internal local area network (LAN), such as a mobile phone 106, a computing device 108, and a health monitoring system 114 (e.g., for monitoring health of a patient in the vehicle 110), among other devices. As the vehicle 110 travels, network switching may facilitate maintaining Internet connectivity for the mobile phone 106, the computing device 108, and the health monitoring system 114, for example, to switch from one network to another to achieve greater QoS or as the vehicle 110 leaves a coverage area of one network (e.g., 112A) and enters a coverage area of another network (e.g., 112B).

To provide seamless and secure connection during network switching, the vehicle 110 may be equipped with a router 104 having a network interface card (NIC) 102. The router 104 may host the internal LAN and may connect to the mobile phone 106, the computing device 108, and the health monitoring system 114 via an access point 116 (e.g., a Wi-Fi access point). The router 104 may also provide secured tunnel, buffering, and mesh network capabilities for the mobile phone 106, the computing device 108, and the health monitoring system 114 on the internal LAN network. The secured tunnel may include a virtual private network (VPN) that may communicatively couple the mobile phone 106, the computing device 108, and the health monitoring system 114 to the Internet (e.g., via the networks 112), or to a centralized computing device (e.g., of a local network at a hospital with which the mobile phone 106, the computing device 108, and/or the health monitoring system 114 may communicate data (e.g., send and/or receive data)). The secured tunnel may provide a persistent connection for communications between the devices 106, 108, 114 and the Internet or the centralized computing device such that, even if a bonded interface is broken, the secured tunnel may provide its own buffer that may prevent interruption during network switching.

The NIC 102 may communicatively couple one or more devices (e.g., the router 104) to one or more networks (e.g., 112A, 112B, 112C, collectively referred to herein as networks 112), such as those provided by one or more service providers. For example, the health monitoring system 114 may transmit data regarding a patient's health to be received at a computing device at a remote location. If the health monitoring system 114 is communicatively coupled to the router 104, the router 104 may receive the request to transmit the health data and forward the request to the NIC 102. The NIC 102 may then forward the request to the one or more networks (e.g., provided by one or more service providers) to be received at the computing device at the hospital. The NIC 102 may include an expansion card that is communicatively coupled to the router 104 (e.g., after manufacture), may be mounted into a motherboard of the router 104 (e.g., after manufacture), may be embedded into the motherboard of the router 104 (e.g., during manufacture), and so on.

The NIC 102 may also perform network switching. Network switching, as defined herein, includes a process of breaking a connection between a device (e.g., the router 104) and a network (e.g., as provided by the network 112A) with which the device is currently communicating and establishing a new connection between the device and another network (e.g., the network 112B as provided by a service provider) that may provide better connection or performance (e.g., greater QoS) to the device. Network switching may be performed along with load balancing or network bonding. Load balancing, as defined herein, may include distributing traffic over multiple connections or devices (e.g., network interfaces). For example, network communication traffic from between the Internet and four client devices (e.g., two mobile phones 106 and two computing devices 108) may be distributed equally over two different network interfaces corresponding to two networks 112 to ensure that the network communication traffic is distributed as desired (e.g., evenly across the two networks 112).

Bonding, as defined herein, may include aggregating multiple individual connections from a source to a destination into a single connection in order to combine the resources of one or more ISPs, which may increase the speed of the single connection. In some embodiments, multiple connections to the same network may be bonded together. For example, a bonded network interface may include a network interface communicatively coupled to one channel of a network while another network interface may be communicatively coupled to another channel of the same network. In this way, bonding may combine the resources of multiple connections to the same network or multiple connections to different networks to increase the data throughput of the connection, which may enable the router 104 (via the NIC 102) to provide more data at faster speeds (e.g., increasing data throughput) and with greater reliability to devices (e.g., the mobile phone 106, the computing device 108, and the health monitoring system 114) communicatively coupled to the LAN. Faster and more reliable network performance may be crucial for healthcare systems used in medical facilities, emergency medical transportation, and so on (e.g., particularly in emergency and/or life-saving scenarios).

Bonding may be accomplished via the use of a virtual private network (VPN) server or other virtual interface. For example, two separate network interfaces may be bonded together into a single bonded interface to communicate with the networks 112 via a VPN server, which may offer performance improvements and redundancy by increasing network throughput and bandwidth. In this way, the VPN server may establish a connection between a device and the Internet using multiple active connections at the same time.

Active connections, as used herein, include connections that are actively transferring data between the networks 112 and a device (e.g., the router 104). A bonded interface may include any appropriate number of interfaces (e.g., one or more, two or more, three or more, five or more, ten or more, and so on) having active connections. For instance, a bonded interface including two network interfaces having active connections may have a configuration described as active/active, while a bonded interface including three network interfaces having active connections may have a configuration described as active/active/active. If there are multiple active connections in a bonded interface, load balancing between the active connections may ensure efficient distribution of resources.

However, not all bonded interfaces have all active connections. In some embodiments, one or more connections may be active and one or more other connections may be inactive or passive. A passive connection may not contribute to the bandwidth of the bonded connection until it is called to do so (e.g., which may occur if certain conditions are met, such as if one or more QoS metrics fall beneath a threshold), at which point the passive connection may be instructed (e.g., by a controller and/or processor of the NIC 102) to become an active connection. Providing additional active connections via additional network interfaces (e.g., an active/active configuration, an active/active/active configuration) may provide greater bandwidth but may also require a larger buffer. As such, a bonded interface configuration including network interfaces having passive connections (e.g., a first network interface having an active connection and a second network interface having a passive connection (referred to as active/passive), a first network interface having an active connection and second and third network interfaces having passives connection (referred to as active/passive/passive), and so on) may enable use of a NIC 102 having a smaller buffer, which may reduce cost and/or conserve space on an integrated circuit.

Figure 2:
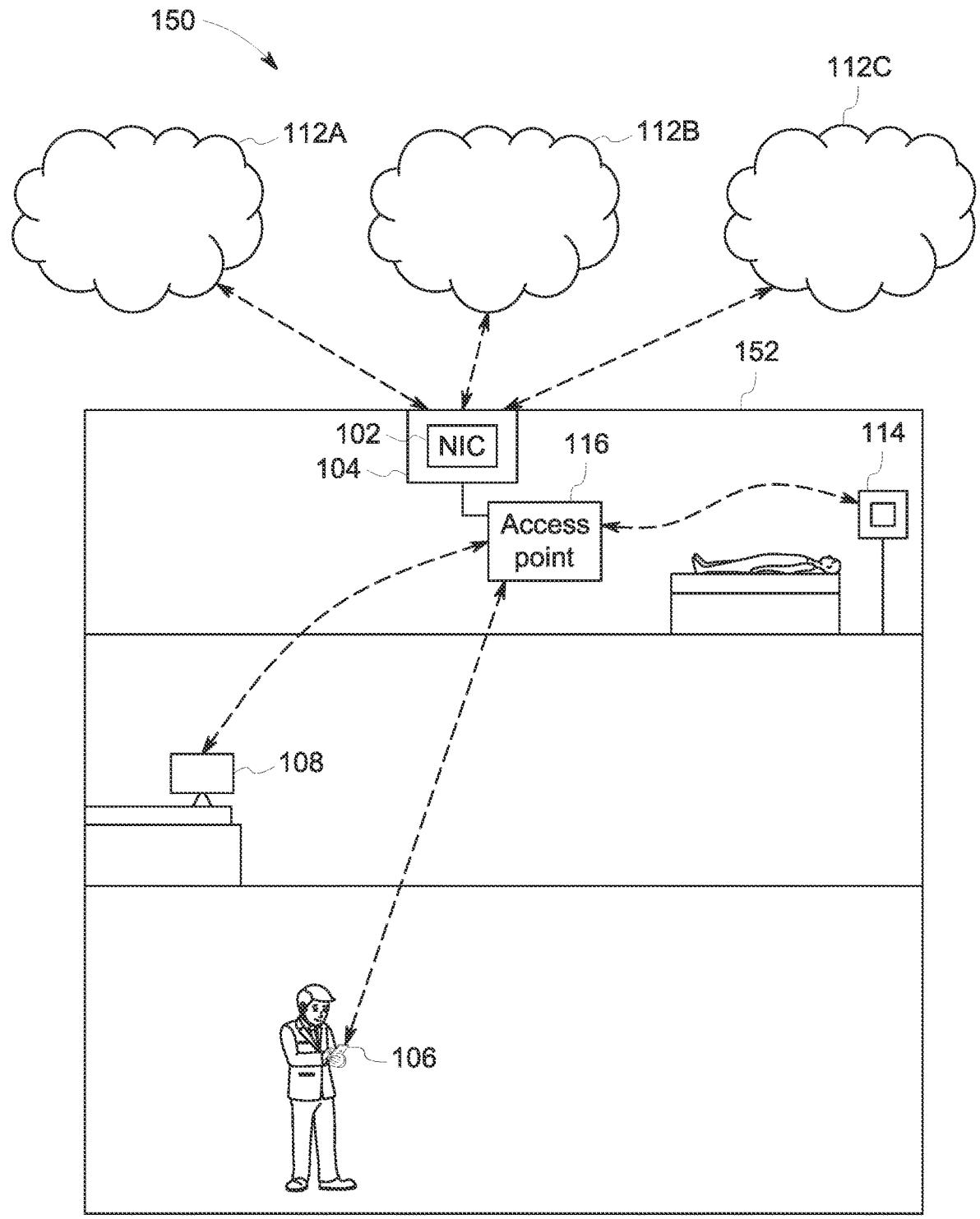
FIG. 2 is a schematic diagram of a communication system for providing a seamless and secure connection between electronic devices in a hospital and a network during interface switching, according to an embodiment of the present disclosure.

FIG. 2 is a schematic diagram of a communication system 150 for providing a seamless and secure connection between electronic devices in a hospital and a network during interface switching, according to an embodiment of the present disclosure. The system 150 may operate within a facility, such as a hospital 152, an urgent care facility, a clinic, and so on. The hospital 152 may include electronic devices, such as the health monitoring system 114 (e.g., for monitoring vital signs of a patient), the computing device 108 (e.g., a computer at a nurse's station or in a doctor's office), and the mobile phone 106 (e.g., to enable communication for and/or between healthcare workers throughout the hospital 152), among other devices. Each of the electronic devices 114, 108, 106 may be communicatively coupled to a LAN network hosted by the router 104, the router coupled to the NIC 102. As previously discussed, the NIC 102 may facilitate communication between the router 104 and devices communicatively coupled to the LAN network hosted by the router (e.g., the mobile phone 106, the computing device 108, the health monitoring system 114) and the networks 112. The NIC 102 may also enable intelligent network switching which may improve network connectivity for and performance of the electronic devices 114, 108, 106, as will be explained in greater detail below.

As previously stated, without using the methods and devices disclosed herein, network switching may cause glitches or interruptions in a network (e.g., Internet) connection for the devices (e.g., 106, 108, 114). For devices used in emergency vehicles (e.g., ambulances) and in hospitals, interruptions in Internet connectivity may result in greater risk to the health of a patient. The interruptions may be caused by devices moving between coverage areas, power issues in the devices 106, 108, 114 and/or network devices (e.g., the router 104), communication network issues, and so on. Additionally, it should be noted that while the router 104 is shown to be communicatively coupled to the mobile phone 106, the computing device 108, and the health monitoring system 114, these devices are merely exemplary, and the router 104 may connect to any number (e.g., one or more, two or more, five or more, ten or more, and so on) of devices.

Figure 3:
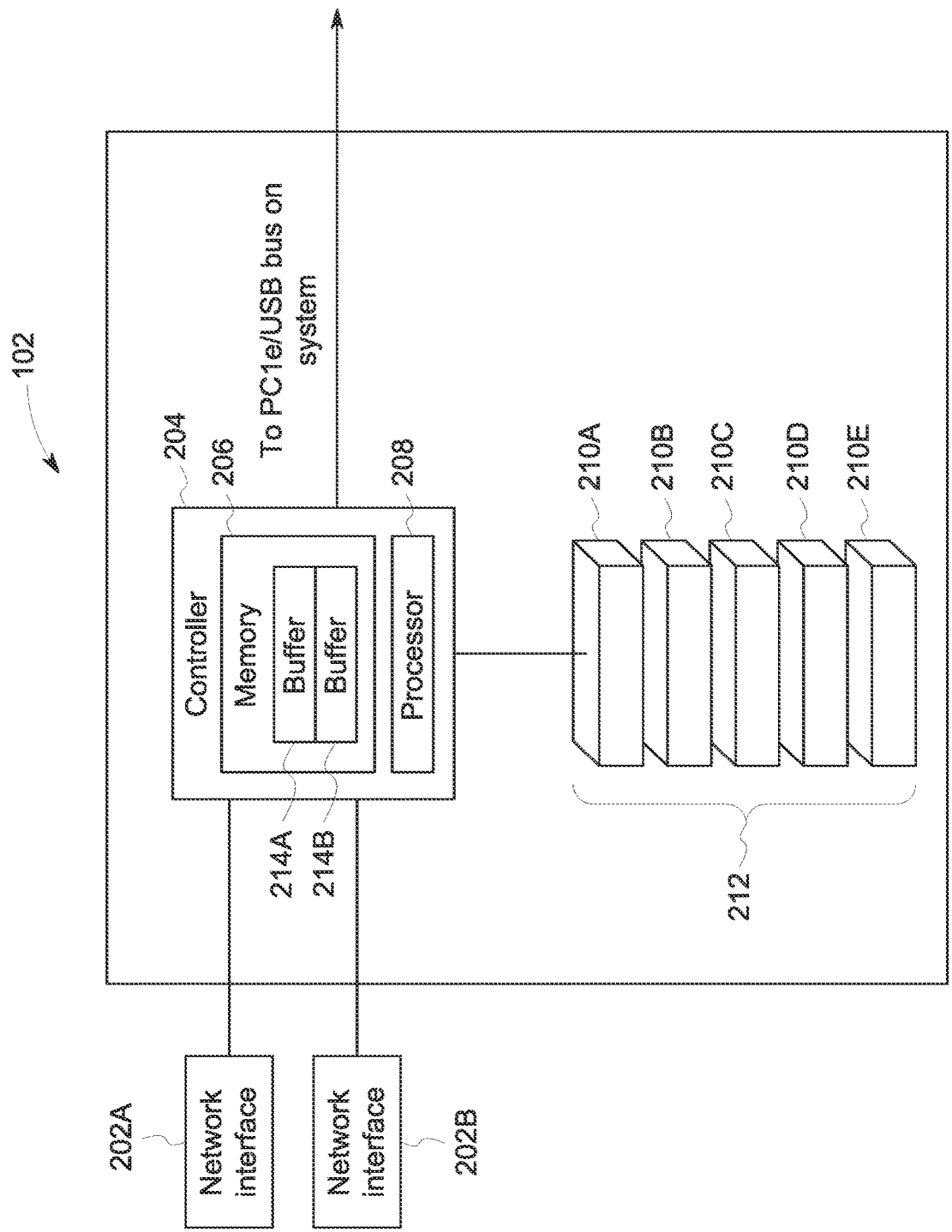
FIG. 3 is a schematic diagram of a network interface card (NIC) via which the communication systems of FIGS. 1 and 2 may provide the seamless and secure connection during network switching, according to an embodiment of the present disclosure.

FIG. 3 is a schematic diagram of the NIC 102, according to an embodiment of the present disclosure. The NIC 102 may include network interfaces 202A and 202B (collectively referred to herein as the network interfaces 202), a controller 204, and SIMs 210A, 210B, 210C, 210D, and 210E (collectively referred to herein as the SIMs 210). The SIMs 210 may include multiple SIM cards or embedded SIMs (eSIMs) arranged in a SIM stack 212. Each SIM 210 may be registered with one of the respective networks 112. The network interfaces 202 may couple to one or more antennas to send and receive wireless signals (e.g., to and from the networks 112).

The controller 204 may include a memory 206 and a processor 208. The memory 206 may include one or more data buffers, such as a buffer 214A and a buffer 214B, collectively referred to herein as buffers 214. The buffers 214A, 214B may, as will be discussed in greater detail in FIG. 4 below, respectively store data from a first network (e.g., 112A) and a second network (e.g., 112B) to prevent glitches or interruptions in service while the NIC 102 switches bonded interfaces during network switching. It should be noted that, while only two buffers 214A, 214B are illustrated, there may be any appropriate number of buffers 214 (e.g., one or more, three or more, five or more, and so on). Additionally, while only one processor 208 is illustrated, it should be noted that the NIC 102 may include one processor, multiple (e.g., two or more, three or more, five or more, ten or more, and so on) processors or processing circuitries.

The controller 204 may enable communication between the NIC 102 and the networks 112 by communicatively coupling each network interface 202 to a SIM 210, wherein each SIM 210 may be registered to a respective network 112. The processor 208 may be operably coupled with the memory 206 to perform or execute various algorithms (e.g., in the form of programs or instructions, including an operating system) stored in the memory 206 to enable the controller 204 to provide various functionalities. The memory 206 or any other suitable article of manufacture and/or computer program product of the NIC 102 may include one or more tangible, computer-readable media. The memory 206 may include any suitable articles of manufacture for storing data and executable instructions, such as random-access memory, read-only memory, rewritable flash memory, hard drives, and optical discs.

The controller 204 may enable intelligent network switching by determining when (e.g., under what conditions) to perform intelligent network switching, which network 112 is switched to, and so on. For example, the controller 204 may determine which one or more networks 112 may be used in forming the bonded interfaces (e.g., based on the QoS of one or more of the networks 112), and may determine when and if to break a first bonded interface and/or create a second bonded interface (e.g., based on determining that the networks 112 of the second bonded interface have one or more higher or otherwise preferable QoS metrics than the networks 112 of the first bonded interface). To enable a device (e.g., the router 104) to communicate with the networks 112 (e.g., via a bonded interface), the controller 204 may communicatively couple the network interfaces 202 to SIMs 210 that are registered to networks 112.

For example, the SIM 210A may be registered with the network 112A and the SIM 210B may be registered with the network 112B. The controller 204 may configure the network interface 202A with the SIM 210A (e.g., by coupling the interface 202A to the SIM 210A) and may configure the network interface 202B with the SIM 210B (e.g., by coupling the interface 202B to the SIM 210B), enabling the NIC 102 (and thus the router 104 and any downstream devices communicatively coupled to the router 104 by, for example, an access point 116 via a peripheral component interconnect express (PCIe) or a universal serial bus (USB)), to communicate with the networks 112A and 112B. As will be discussed in greater detail below, utilizing more than one SIM 210 (e.g., two or more, three or more, five or more) that facilitate communication with more than one network 112 may improve the performance of an electronic device (e.g., the mobile phone 106, the computing device 108, and/or the health monitoring system 114). For example, if the vehicle 110 (e.g., an ambulance) were to travel outside of the coverage area of network 112A, the electronic devices within the vehicle may maintain connection, as the NIC 102 may still communicate with the network 112B via the SIM 210. Similarly, if the network 112A were to undergo a power issue and stop providing network service to the mobile phone 106, the mobile phone 106 may switch to using the network 112B via the SIM 210. Further, the performance of the network 112B may improve, or a new SIM (e.g., 210C) registered with the network 112C may be coupled to a network interface 202, and the network interface 202 coupled to the SIM 210A may be bonded with the network interface 202 coupled to the SIM 210C to combine the bandwidth of the network 112A and the network 112C, and thus boost network performance for the devices in the vehicle 110 above what a non-bonded interface (e.g., only coupled to the network 112A) may achieve.

Figure 4:
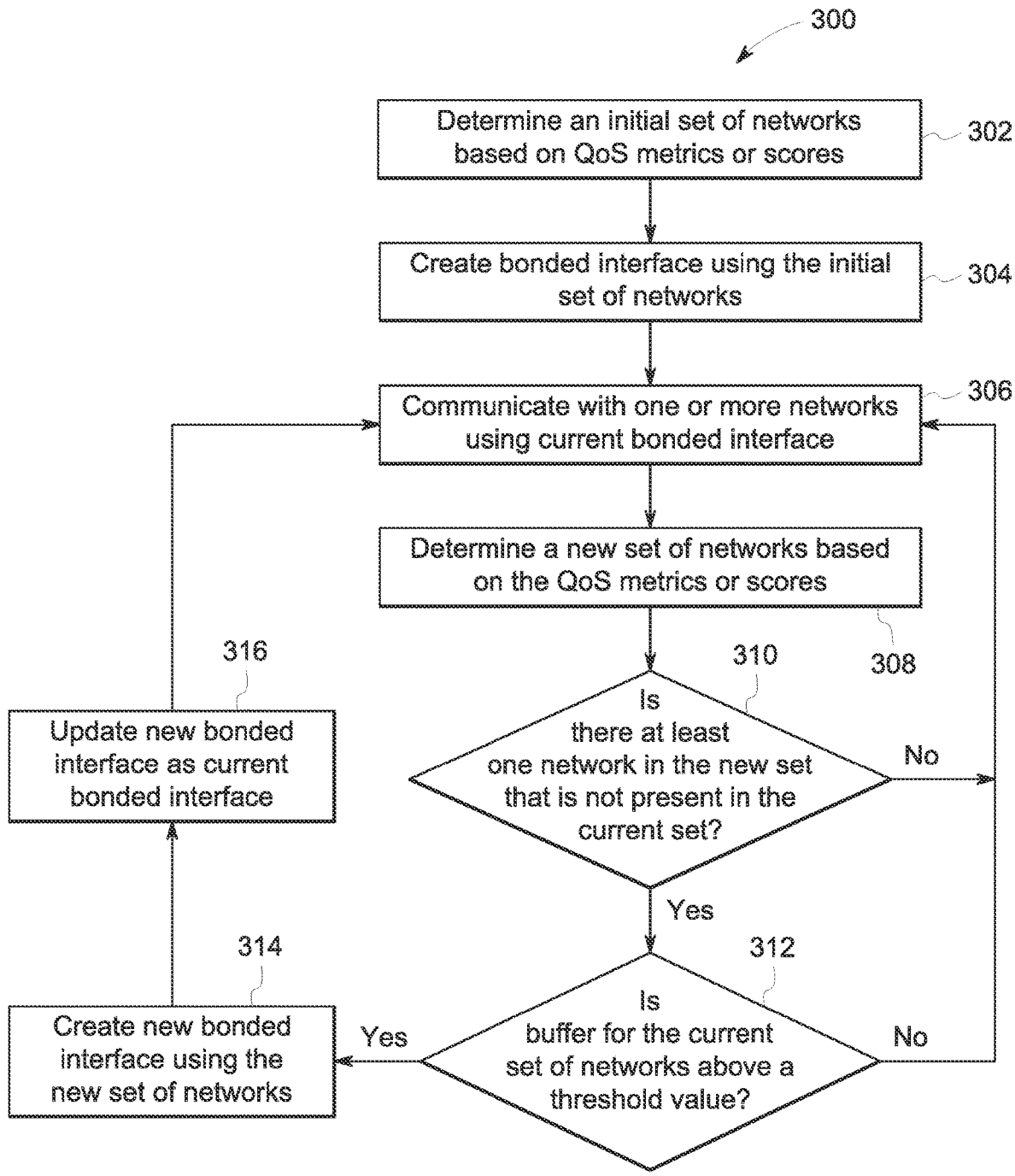
FIG. 4 is a flowchart of a method for facilitating seamless and secure connection during network switching, according to an embodiment of the present disclosure.

FIG. 4 is a flowchart of a method 300 for facilitating seamless and secure connection during network switching, according to an embodiment of the present disclosure. Any suitable device (e.g., the controller 204) that may control components of the NIC 102, such as the processor 208, may perform the method 300. In some embodiments, the method 300 may be implemented by executing instructions stored in a tangible, non-transitory, computer-readable medium, such as the memory 206, using the processor 208. For example, the method 300 may be performed at least in part by one or more software components, such as an operating system, one or more software applications of the router 104, and the like. While the method 300 is described using steps in a specific sequence, it should be understood that the present disclosure contemplates that the described steps may be performed in different sequences than the sequence illustrated, and certain described steps may be skipped or not performed altogether.

In process block 302, the NIC 102 determines an initial set of networks 112 having an acceptable (e.g., the highest) quality of service (QoS) based on one or more metrics. In particular, the NIC 102 may determine or measure one or more QoS metrics of each network 112 at a given time or averaged over a given window of time (e.g., 1 second, 30 seconds, 1 minute, 5 minutes, 10 minutes, 30 minutes, one hour, and so forth) and select one or more of the networks 112 as part of the initial set of the networks based on the QoS metrics. QoS metrics or scores may be associated with any performance aspects of a network connection, such as service response time/latency, packet loss, signal-to-noise ratio, service interruptions, loudness levels, crosstalk, and so on. The NIC 102 may determine the initial set of networks 112 based on a number of network comparisons. For example, in one embodiment the NIC 102 may select the networks 112 having the highest overall QoS scores. In another embodiment the NIC 102 may select the networks 112 that have QoS scores above a QoS score threshold (e.g., networks 112 that have "passing" QoS scores). In another embodiment the NIC 102 may select the networks 112 that don't have QoS scores below the QoS score threshold (e.g., networks 112 that don't have "failing" QoS scores).

In another embodiment, the NIC 102 may select the networks 112 based on the particular performance aspects discussed above. For example, the NIC 102 may select the networks 112 based on a weighted average, wherein various weighting factors may be applied to the performance aspects, causing certain performance aspects to be more significant (e.g., with heavier or greater weights) in determining an overall QoS score (e.g., response time/latency and service interruptions may be associated with a greater weighting factor than loudness levels, which may be associated with a lesser weighting factor). In other embodiments, the NIC 102 may select the networks 112 based on a particular performance aspect. For example, the NIC 102 may select the networks 112 with the highest signal-to-noise ratio or reaching a signal-to-noise ratio threshold. In yet another embodiment, the NIC 102 may veto a network 112 based on the network 112 having a performance aspect that falls below a certain performance threshold. For example, if the network 112 has a passing QoS score, but the crosstalk within the network 112 falls below an acceptable crosstalk threshold, the NIC 102 may veto the network 112.

As previously stated, each SIM 210 may be registered to a respective network 112. For example, the SIM 210A may be registered to the network 112A, the SIM 210B may be registered to the network 112B, the SIM 210C may be registered to the network 112C, and so on. Upon determining the QoS of each network 112, the NIC 102 may determine that, for example, the network 112A and the network 112B have the two highest QoS measurements.

In process block 304, the NIC 102 creates a bonded interface using the networks 112 with the selected networks based on one or more respective QoS measurements (e.g., 112A and 112B via the network interfaces 202A and 202B) as the initial set. As previously discussed, a bonded interface, as used herein, may include a single virtual connection formed from multiple (e.g., two or more) network interfaces 202 bonded together to combine the resources of multiple networks 112, or multiple connections to the same network 112. As such, the bonded interface may be created by coupling the network interfaces 202A (communicating with the network 112A via the SIM 210A) and 202B (communicating with the network 112B via the SIM 210B) together. As previously discussed, using multiple SIMs 210 and creating and communicating over bonded interfaces may provide greater data throughput, network speed, and reliability, which may improve the performance of Internet-connected devices (e.g., the mobile phone 106, the computing device 108, the health monitoring system 114) used in emergency vehicles or medical facilities. The resulting superior network performance may be crucial for healthcare systems used in medical facilities, emergency medical transportation, and so on (e.g., particularly in emergency and/or life-saving scenarios). In process block 306, the NIC 102 enables communication between an electronic device (e.g., the mobile phone 106, the computing device 108, and/or the health monitoring system 114 via the router 104) and the networks 112A and 112B via the bonded interface. In process block 308, the NIC 102 rechecks the QoS of each network 112 to determine the networks 112 based on the QoS metrics (e.g., the highest QoS scores or metrics).

In the query block 310, the NIC 102 determines whether a new set of the networks 112 meet the selection threshold or criteria based on QoS measurements. Continuing with the previous example, the initial determination in the process block 302 was that the network 112A and the network 112B had the highest QoS. If this remains true, the method 300 may loop back to the process block 306, to continue communicating with the networks 112A and 112B. However, if upon re-determining the QoS of the networks 112, the NIC 102 determines that the network 112B and the network 112C now have the highest QoS, in query block 312, the NIC 102 determines whether a buffer (e.g., 214A storing data from the network 112A) is storing a sufficient amount of data (e.g., the amount of buffered data is above a threshold value). The NIC 102 may determine the buffer amount in the buffer 214A to ensure that there is an adequate amount of data in the buffer 214A (e.g., above the threshold value) before breaking the bonded interface to prevent data interruptions when switching from the current set of the networks 112 (e.g., 112A and 112B) to the new set of the networks 112 (e.g., 112B and 112C). Alternatively, if the NIC 102 determines that the network 112A and 112C have the highest QoS, the NIC 102 determines whether the buffer 214B, storing the data of the network 112B, has stored a sufficient amount of data. As such, the NIC 102 may determine the buffer amount for the buffer 214 corresponding to the network connection having the lower QoS that may be broken to ensure that a user detects no interruption when switching to another network connection.

In particular, the buffer 214A may be used to store data from the network 112A, while the buffer 214B may be used to store data from the network 112B. Continuing with the previous example, if the network 112A is determined to have the lowest performance metric (e.g., a QoS score or other appropriate performance metric), the buffer 214A may output the stored data when breaking the bonded interface during network switching, which includes the breaking of the connection with the network 112A. That is, the data from the buffers 214 may be provided during the breaking of one bonded interface and the creation of a new bonded interface, such that the devices (e.g., the mobile phone 106, the computing device 108, and the health monitoring system 114) connected to the router 104 on the LAN via the access point 116 may begin communicating with the new set of networks (e.g., 112B and 112C) in the new bonded interface.

By outputting the stored data, the buffer 214A may provide a seamless transition from one bonded interface to another, making it appear, to a user using one of the devices, that there was no interruption in network service. As mentioned above, the NIC 102 (e.g., via the controller 204) may determine whether there is an adequate amount of data in the buffer 214A corresponding to the network (e.g., 112A) for which the connection is to be broken when network switching by determining whether the data in the buffer is above a threshold value. The threshold buffer value may be based on a total storage capacity of the buffer 214 that stores the buffered data. For example, the threshold buffer value may be specified as 10% or more, 25% or more, 50% or more, 75% or more, or any other portion or percentage of the total storage capacity of the buffer 214 that facilitates seamless transition to another network 112. In additional or alternative embodiments, the threshold buffer value may be specified as an amount of data, such as 10 bytes or more, 100 bytes or more, 1 kilobyte (kB) or more, 10 kB or more, 100 kB or more, 1 megabyte (MB) or more, 2 MB or more, and so on.

If the buffer for the current set of the networks 112 is not above the threshold buffer value, then the NIC 102 may loop back to the process block 306 to continue communicating with the current set of the networks 112 (e.g., 112A and 112B) until the current set of the networks 112 has a sufficient amount of buffer to prevent interruptions in communication when performing network switching. If the buffer for the current set of the networks 112 is above the threshold buffer value, the NIC 102, in process block 314, creates a new bonded interface using the new set of the networks 112 (e.g., 112B and 112C) that have the highest QoS. To create the new bonded interface, the NIC 102 may break the current bonded connection by decoupling the network interface 202 from the SIM 210 registered with the network 112 having the lower or lowest QoS (e.g., decoupling the network interface 202A from the SIM 210A registered to the network 112A), couple the network interface to the SIM 210 registered with the network 112 having a higher or highest QoS (e.g., coupling the network interface 202A to the SIM 210C registered the network 112C), and use data stored in the buffer 214 to prevent interruptions while recoupling the network interfaces 202A (now coupled to the SIM 210C) and 202B (still coupled to the SIM 210B) to create the new bonded interface. In process block 316, the NIC 102 updates the new bonded interface as the current bonded interface, and returns to the process block 306 to communicate with the one or more networks 112. As such, the method 300 enables the NIC 102 to facilitate seamless and secure connection during network switching.

Figure 5:
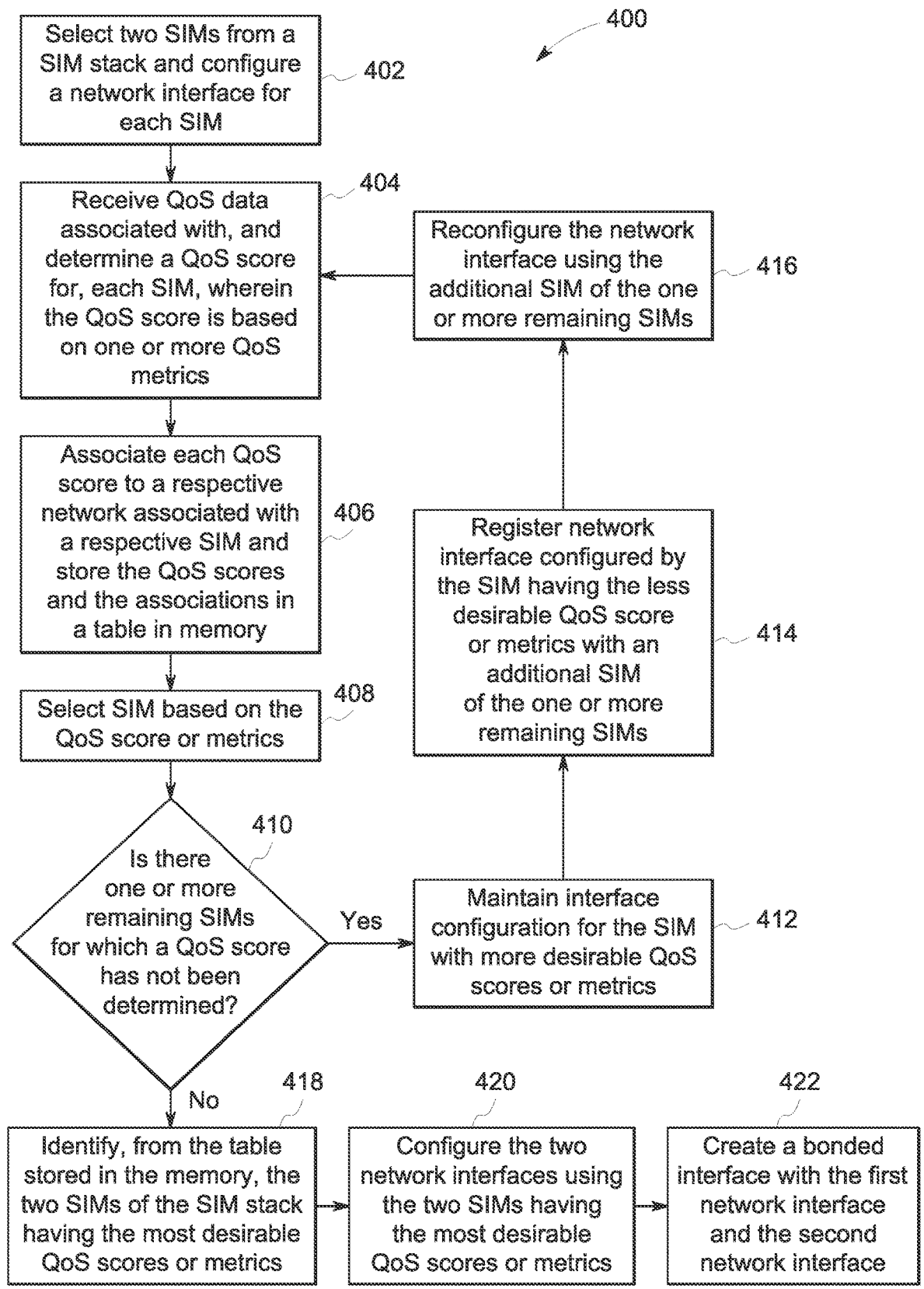
FIG. 5 is a flowchart of a method for creating bonded interfaces between two or more networks to facilitate seamless and secure connection during network switching, according to an embodiment of the present disclosure.

FIG. 5 is a flowchart of a method 400 for creating bonded interfaces between two or more networks to facilitate seamless and secure connection during network switching, according to an embodiment of the present disclosure. Any suitable device (e.g., the controller 204) that may control components of the NIC 102, such as the processor 208, may perform the method 400. In some embodiments, the method 400 may be implemented by executing instructions stored in a tangible, non-transitory, computer-readable medium, such as the memory 206, using the processor 208. For example, the method 400 may be performed at least in part by one or more software components, such as an operating system, one or more software applications of the router 104, and the like. While the method 400 is described using steps in a specific sequence, it should be understood that the present disclosure contemplates that the described steps may be performed in different sequences than the sequence illustrated, and certain described steps may be skipped or not performed altogether.

In process block 402, the controller 204 of the NIC 102 (e.g., via the processor 208) selects two SIMs 210 from a SIM stack and configures a network interface (e.g., a WAN interface) for each SIM 210. For example, the SIM 210A may be registered with the network 112A and the SIM 210B may be registered with the network 112B. The controller 204 may select SIM 210A and SIM 210B from the SIM stack 212. The controller 204 may configure the network interface 202A using the SIM 210A and may configure the network interface 202B using the SIM 210B, enabling the network interfaces 202A and 202B to communicate with the networks 112A and 112B associated with the SIM 210A and 210B.

In process block 404, the controller 204 receives QoS data associated with each selected SIM 210 (e.g., 210A and 210B). Based on the received QoS data (e.g., an indication of response time/latency, packet loss, signal-to-noise ratio, service interruptions, loudness levels, crosstalk, and so on), the controller 204 may determine a QoS score for each SIM 210. In process block 406, the controller 204 associates each determined QoS score with a respective network 112 associated with each SIM 210 and stores the QoS scores and the associated networks 112 in a table (e.g., a lookup table) in the memory 206. For example, the controller 204 may determine a QoS score for the SIM 210A and associate the QoS score to the network 112A to which the SIM 210A is registered. The controller 204 may then store the QoS score and the network 112A in the memory 206.

In process block 408, the controller 204 determines which selected SIM 210A or 210B is associated or has a higher QoS score. In query block 410, the controller 204 determines if there is at least one remaining SIM 210 in the SIM stack for which a QoS score has not been determined. If the controller 204 determines that there is at least one remaining SIM 210 for which a QoS score has not been determined (e.g., there is at least one SIM 210 of the SIM stack that has not been chosen in the process block 402), in process block 412, the controller 204 maintains the interface configuration for the network interface 202 configured using the SIM 210 with the higher QoS score. For example, if the controller 204 determines that there is at least one remaining SIM 210 for which a QoS score has not been determined, and the controller 204 determines in the process block 408 that the SIM 210A has a higher QoS score, in the process block 412 the controller 204 may maintain the interface configuration for the network interface 202A.

In process block 414, the controller 204 registers the network interface 202 (e.g., 202B) configured by the SIM 210 having the lower QoS score (e.g., 210B) with an additional SIM 210 of the remaining SIMs 210 (e.g., the SIMs 210C, 210D, or 210E). For example, from the query block 410, the controller 204 may have determined that there are one or more remaining SIMs 210 (e.g., the SIMs 210C, 210D, or 210E) for which a QoS score has not been determined. The controller 204 may select the SIM 210C as the additional SIM, and may register the network interface 202B with the SIM 210C. In process block 416, the controller 204 reconfigures the network interface 202B using the SIM 210C, such that the network interface 202B may communicate with the network 112 associated with the SIM 210C (e.g., the network 112C). The controller 204 may then loop back to the process block 404 and receive QoS data associated with the SIM 210C and determine a QoS score for the SIMs 210A and 210C. The steps of the method 400 illustrated in the process blocks 402-416 may repeat for all remaining SIMs (e.g., 210D and 210E) until there are no SIMs remaining for which a QoS score has not been determined.

Referring back to the query block 410, if the controller 204 determines there are no remaining SIMs 210 for which a QoS score has not been determined (e.g., the controller 204 has cycled through and has determined a QoS score for all of the SIMs 210 of the SIM stack 212), the controller 204 may, in process block 418, determine or identify, from the table stored in the memory 206, the two SIMs 210 of the SIM stack 212 with the highest QoS scores. In process block 420, the controller 204 configures the two network interfaces 202A and 202B using the two identified SIMs 210 having the highest determined QoS scores. In process block 422, the controller 204 creates a bonded interface with the first network interface 202A and the second network interface 202B. In this way, the method 400 creates bonded interfaces between two or more networks to facilitate seamless and secure connection during network switching.

It should be noted that the method 400 may be a recursive method. As such, after creating the bonded interface, the controller 204 may continue to select various SIMs 210, determine updated QoS scores, compare SIMs 210 to determine which has the highest QoS score, and replace the SIM 210 having the lowest QoS score with another SIM 210 having a greater QoS score. It should also be noted that, while the examples above used two SIMs 210 and two network interfaces 202 at a time, the method 400 may be scaled to accommodate any appropriate number of SIMs 210 (and, accordingly, networks 112) and network interfaces (e.g., 3 or more, 4 or more, 10 or more, and so on).

Figure 6:
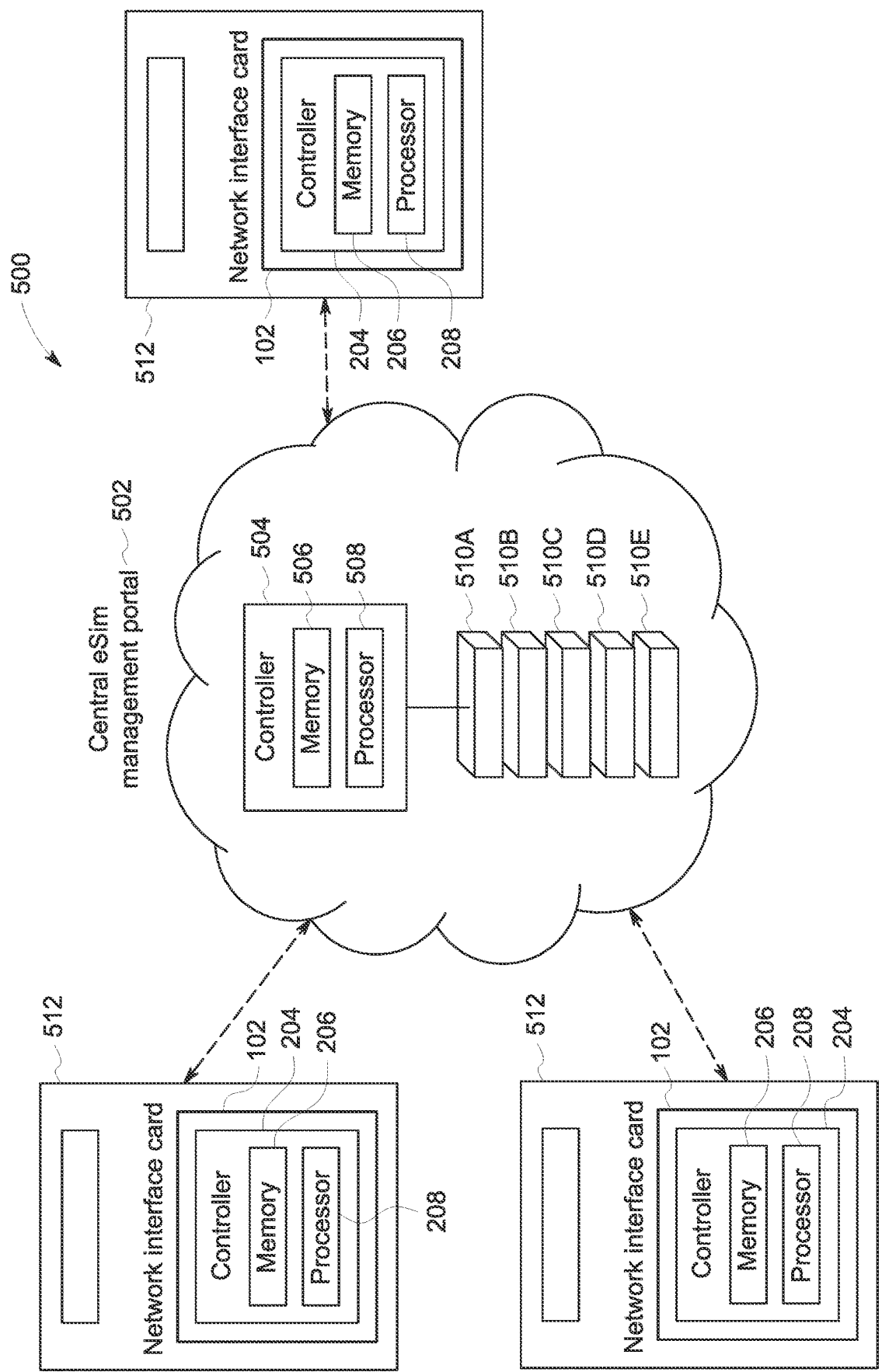
FIG. 6 is a schematic diagram of an embedded subscriber identification module (eSIM) management system for providing and managing eSIMs across multiple electronic devices, according to an embodiment of the present disclosure.

FIG. 6 is a schematic diagram of an eSIM management system 500 for providing and managing eSIMs across multiple devices, according to an embodiment of the present disclosure. The eSIM management system 500 may include a central eSIM management portal 502 having a controller 504, the controller having a memory 506, and a processor 508, and multiple eSIMs 510A, 510B, 510C, 510D, and 510E (collectively referred to herein as the eSIMs 510). The eSIM management system 500 may also include multiple devices, such as one or more devices 512. The devices 512 may include a laptop, tablet, cell phone, medical equipment, and so on. In some embodiments, at least some of the devices 512 may include mobile devices, traveling larger distances in a vehicle 110 (e.g., an ambulance, a fire engine) or smaller distances (e.g., within a facility, such as a hospital). In particular, the eSIM management portal 502 may transmit (e.g., via a transmitter) and receive (e.g., via a receiver) eSIMs 510 to and from a variety of NICs 102.

Each eSIM 510 may be registered with a network (e.g., 112). Different networks 112 may provide network connections of varying quality depending on location. As such, the eSIM management portal 502 may receive and store performance data of each network 112 corresponding to a respective eSIM 510 for different geographical areas. In particular, the eSIM management portal 502 may indicate the networks 112 and/or corresponding eSIMs 510 that have the highest QoS scores for the different geographical areas. In this way, the best-performing eSIM 510 may be selected when the device 512 is in that geographical area (e.g., as the device moves through different geographical areas due to, for example, being in a vehicle 110 such as an ambulance).

Figure 7:
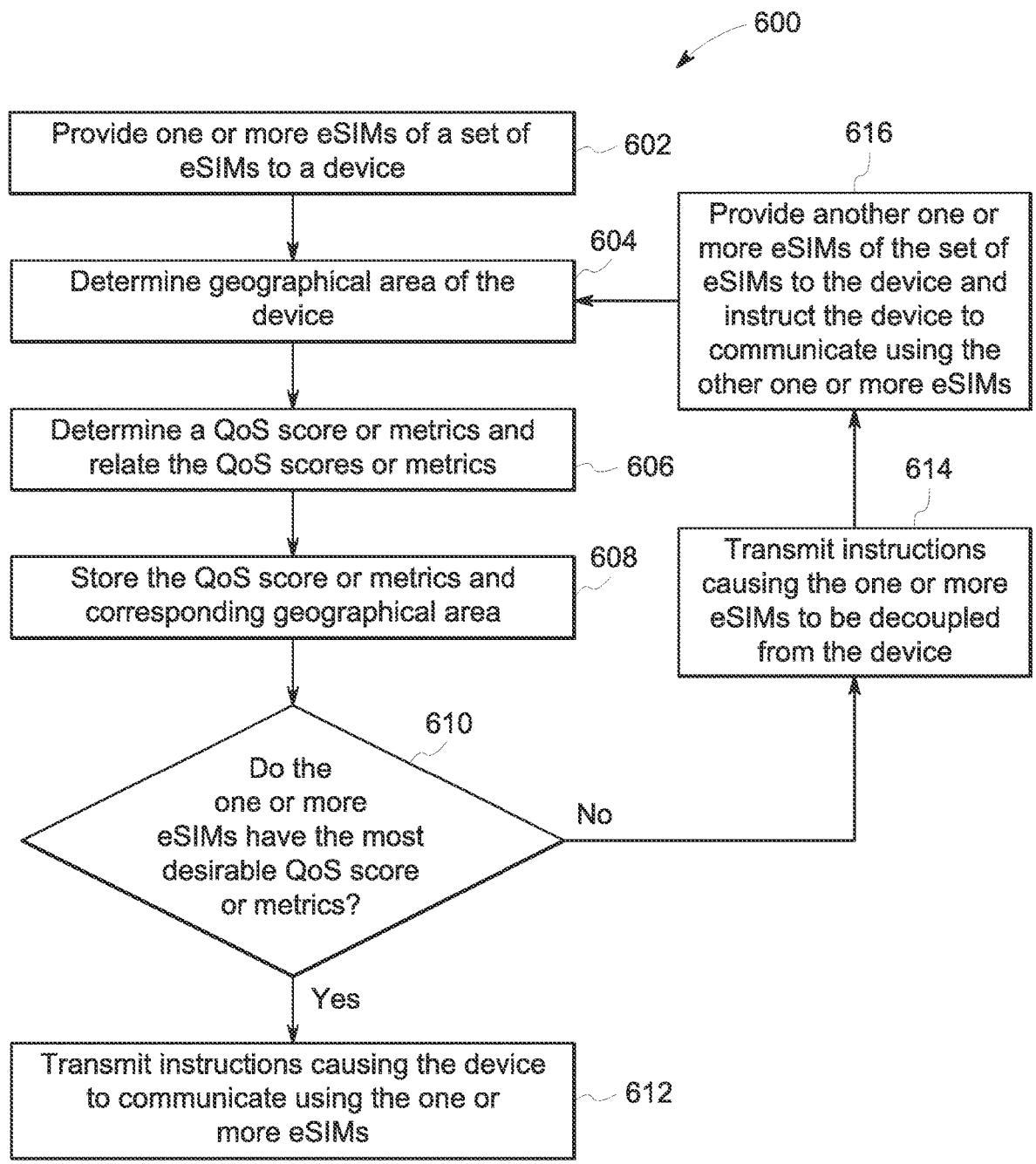
FIG. 7 is a flowchart of a method for providing and managing the eSIMs across multiple units using the eSIM management system of FIG. 6, according to an embodiment of the present disclosure.

With this in mind, FIG. 7 is a flowchart of a method 600 for providing and managing the eSIMs 510 across multiple devices (e.g., 512), according to an embodiment of the present disclosure. Any suitable device that may control components of the eSIM management portal 502, such as the controller 504 or the processor 508, may perform the method 600. In some embodiments, the method 600 may be implemented by executing instructions stored in a tangible, non-transitory, computer-readable medium, such as the memory 506, using the processor 508. For example, the method 600 may be performed at least in part by one or more software components, such as an operating system, one or more software applications of the eSIM management portal 502, and the like. While the method 600 is described using steps in a specific sequence, it should be understood that the present disclosure contemplates that the described steps may be performed in different sequences than the sequence illustrated, and certain described steps may be skipped or not performed altogether.

In process block 602, the eSIM management portal 502 provides one or more eSIMs 510 to a device 512 having the NIC 102. The eSIM management portal 502 may include, for example, five eSIMs 510 (though it should be understood that more or fewer eSIMs 510 are contemplated, such as two or more eSIMs 510, three or more eSIMs 510, six or more eSIMs 510 eight or more eSIMs 510, ten or more eSIMs 510, and so on). The eSIM management portal 502 may provide, to the device 512, a set of eSIMs 510 including a portion of the total eSIMs 510 stored by the eSIM management portal 502 (e.g., the set may include one or more eSIMs 510, two or more eSIMs 510, three or more eSIMs 510, or four or more eSIMs 510, and so on). As previously discussed, the devices 512 may include a laptop, tablet, cell phone, medical equipment, and so on. In some embodiments, at least some of the devices 512 may include mobile devices, traveling larger distances in a vehicle 110 (e.g., an ambulance, a fire engine) or smaller distances (e.g., within a facility, such as a hospital).

In process block 604, the eSIM management portal 502 determines a geographical area in which the device 512 is located. In particular, the central eSIM management portal 502 may determine the location of the device 512 by requesting, via the processor 508 of the controller 504, global positioning system (GPS) data or any other appropriate location data (e.g., latitude and/or longitude information) from the device 512. The location may then be related to a geographical area that includes the geographical location. In process block 606, the eSIM management portal 502 determines a QoS score for each eSIM 510 and relates the determined QoS score to the geographical area of the eSIM 510. The QoS score may indicate the quality of network connection provided to the device having the eSIM 510 and by the network 112 to which the eSIM 510 is registered. In process block 608, the eSIM management portal 502 stores the QoS score and corresponding geographical area in a table (e.g., a lookup table) in the memory 506. For example, the eSIM management portal 502 may store the QoS score for the geographical area (e.g., corresponding to a coverage area of a base station, a geographical area defined by latitude and longitude coordinates, a geo-fenced area, and so on).

In query block 610, the eSIM management portal 502 determines if the one or more eSIMs 510 provided to the device 512 have the highest QoS for the geographical area of the device 512. The eSIM management portal 502 may make this determination by comparing the QoS scores for the one or more eSIMs 510 provided to the device 512 to the QoS scores for the remaining eSIMs 510 stored in the eSIM management portal 502, and/or the QoS scores for eSIMs 510 stored in another device 512 of the eSIM management system 500.

This determination made be made on a periodic basis (e.g., every minute, every ten minutes, every thirty minutes, every hour, or the like), may be made based on determining that the location of the device 512 has changed (e.g., that the device 512 has moved to a different floor of a building, that the device 512 has moved to a new coverage area, that the device 512 has moved from the cell of one base station to the cell of another base station), may be based on determining that the QoS scores of the one or more eSIMs provided to the device 512 have dropped below a QoS threshold, and so on. For example, the QoS threshold may include a latency threshold, such that the eSIM management portal 502 may re-determine the QoS scores for the eSIMs 510 provided to the device 512 and compare those QoS scores against the eSIMs 510 stored in the eSIM management portal 502 and/or against the eSIMs 510 stored in other devices 512 (e.g., a mobile phone located in a different geographical area) if the network latency has fallen below a certain latency threshold (e.g., latency exceeds 1 millisecond, 2 milliseconds, 5 milliseconds, 10 milliseconds, or the like). The QoS threshold may also include a threshold reduction in bandwidth. For example, the eSIM management portal 502 may again re-determine QoS scores if the bandwidth of the connection reduces by a certain percentage (e.g., 5%, 10%, 25%, 50%, or the like) or a certain bandwidth amount.

If the eSIM management portal 502 determines that the eSIMs 510 provided to the device 512 have the highest QoS score for the geographical area in which the device 512 is located, then, in process block 612, the eSIM management portal 502 transmits (e.g., via a transmitter) instructions to the device 512 causing the device 512 to communicate or continue to communicate with the networks 112 using the one or more eSIMs 510 provided to the device 512. However, if the eSIM management portal 502 determines that the eSIMs 510 provided to the device 512 do not have the highest QoS scores for the geographical area, then the eSIM management portal 502, in process block 614, transmits (e.g., via a transmitter) instructions to the device 512 causing the device 512 to decouple the one or more eSIMs 510 from the device 512. For example, the instructions may cause the device 512 to stop using the provided eSIMs 510 to communicate with the network 112, remove (e.g., erase from the memory 206) the eSIMs 510 from the device 512, and so on.

In process block 616, the eSIM management portal 502 provides another one or more eSIMs 510 registered with one or more other networks 112 to the device 512, and instructs the device 512 to communicate using the other one or more eSIMs. The other one or more eSIMs 510 provided to the device 512 may be obtained from the eSIM management portal 502 itself (e.g., stored in the memory 506) or may be transferred from another device 512 in the eSIM management system 500. Providing the eSIMs 510 to the device 512 may include electronically transmitting the eSIMs 510 from the eSIM management portal 502 or another device 512 to the device 512. The eSIM management portal 502 may repeat the process blocks 604-610 and 614-616 until the eSIMs 510 with the highest QoS score have been identified.

The eSIM management portal 502 may iteratively perform the steps in the method 600 on a periodic basis (e.g., every minute, every ten minutes, every thirty minutes, every hour, or the like), based on determining a change in location for the devices 512 (e.g., that the device 512 has moved to a different floor of a building, that the device 512 has moved to a new coverage area, that the device 512 has moved from the cell of one base station to the cell of another base station), may be based on determining that the QoS scores of the one or more eSIMs provided to the device 512 have dropped below a QoS threshold (e.g., as described above), and so on. In this way, the method 600 enables the eSIM management portal 502 to provide and manage the eSIMs 510 across multiple devices 512.

Technical effects of the invention include a network interface card (NIC) coupled to a routing device (e.g., a router) to enable a seamless and secure network connection during network switching. The router may host a local area network (LAN) where one or more electronic devices may be communicatively coupled to LAN via the router. The router may, via the NIC, enable communication between the one or more electronic devices and a wide area network (WAN). The NIC may include multiple eSIMs, each of the multiple eSIMs may be registered to a network and may be capable of coupling with one or more network interfaces. The network interfaces may be bonded together to form a bonded interface, which may improve the data throughput capabilities, speed, and reliability of the connection between the one or more networks and the one or more electronic devices. Faster and more reliable network performance may result in quicker response time and increased quality of healthcare, particularly in emergency and/or life-saving scenarios.

The technical effects further include determining QoS scores for one or more networks and generating a first bonded interface using an initial combination of networks, and establishing communication between the networks and one or more devices over the first bonded interface. Periodically, in response to determining a change in location of the one or more devices, or in response to determining a drop in the QoS scores of the networks in the first bonded interface, the QoS scores for the remaining networks not included in the first bonded interface may be determined. If any of the remaining networks have a greater QoS score than the networks used in the first bonded interface, then a buffer stored in a memory of a NIC may be evaluated. If the buffer meets a buffer threshold (e.g., the buffer has stored enough data such that switching bonded interfaces will not cause an interruption of service to the NIC), then the first bonded interface will be broken, and a second bonded interface including the particular networks of the remaining networks having the greater QoS scores will be generated. The one or more devices may communicate with the particular networks of the remaining networks having the greater QoS score via the second bonded interface.

Additionally, an eSIM management system may store a variety of eSIMs in an eSIM management portal. The eSIM management portal may distribute the eSIMs to various devices (e.g., cellphones, laptop computers, medical devices) as needed. The eSIM management portal may record and store the QoS scores of the variety of eSIMs and correlate the QoS scores to the geographical area of the devices to which the eSIMs were provided. The eSIM management portal may again determine the QoS scores of the eSIMs stored in the eSIM management portal as well as the eSIMs provided to the various devices. If the eSIMs in the devices have a lower QoS score than other eSIMs stored in the eSIM management portal or stored in another device, the eSIM management portal may swap out or otherwise rearrange the eSIMs in order to enhance or optimize the QoS scores for the eSIMs in the eSIM management system. For instance, if the eSIM management portal determines that a first device has a first set of eSIMs that do not have the highest QoS scores for the geographical area of the first device, the eSIM management portal may decouple one or more eSIMs of the first set of eSIMs from the first device and provide a second set of eSIMs to the first device. The second set of eSIMs may come from the eSIM management portal itself, a second device, or both.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A network interface card, comprising:
 a first network interface configured to communicate with a first network using a first subscriber identification module (SIM) of a plurality of SIMs each configured to register with a respective network, wherein the network interface card is configured to couple with the plurality of SIMs;
 a second network interface configured to communicate with a second network using a second SIM of the plurality of SIMs; and a controller comprising a processor and a memory, wherein the memory comprises a first buffer and a second buffer, and wherein the processor is configured to:
- establish a first connection between the first network interface and the first network by coupling the first SIM to the first network interface;
- establish a second connection between the second network interface and the second network by coupling the second SIM to the second network interface;
- generate a first bonded interface by coupling the first network interface to the second network interface;
- break the first bonded interface by decoupling the first SIM from the first network interface or the second SIM from the second network interface based on one or more performance metrics of the first network or the second network;
- establish a third connection between the first network interface and a third network by coupling a third SIM of the plurality of SIMs to the third first network interface; and
- generate a second bonded interface by recoupling the first network interface to the second network interface.

2. The network interface card of claim 1, wherein the processor is configured to couple to a routing device, wherein the routing device is configured to provide a secure channel between one or more devices communicatively coupled to the routing device and the first network, the second network, or the third network, or any combination thereof.

3. The network interface card of claim 2, wherein the secure channel comprises an encrypted virtual private network tunnel.

4. The network interface card of claim 2, wherein the processor is configured to couple to the routing device via a Peripheral Component Interconnect Express interface.

5. The network interface card of claim 2, wherein the processor is configured to couple to the routing device via a Universal Serial Bus interface.

6. The network interface card of claim 1, wherein the plurality of SIMs comprises at least one SIM card.

7. The network interface card of claim 1, wherein the plurality of SIMs comprises at least one embedded SIM.

8. The network interface card of claim 1, wherein the processor is configured to break the first bonded interface based on determining that the third network comprises a higher quality of service (QOS) score compared to one or both of the first network and the second network.

9. The network interface card of claim 1, wherein the first buffer is configured to store first data received via the first network interface and the second buffer is configured to store second data received via the second network interface, wherein the processor is configured to generate the second bonded interface based on determining that the first data or the second data is sufficient to prevent data interruption associated with breaking the first bonded interface and generating the second bonded interface.

10. The network interface card of claim 9, wherein the processor is configured to determine that the first data or the second data is sufficient to prevent the data interruption by determining that the first data or the second data satisfies a buffer threshold.

11. The network interface card of claim 1, wherein the first network interface comprises a first active connection and the second network interface comprises a second active connection.

12. The network interface card of claim 1, wherein the first network interface comprises an active connection and the second network interface comprises a passive connection.

13. A method comprising:
- establishing a first connection between a first network interface and a first network by coupling a first subscriber identification module (SIM) of a plurality of SIMs to the first network interface;
- establishing a second connection between a second network interface and a second network by coupling a second SIM of the plurality of SIMs to the second network interface;
- generating a first bonded interface by coupling the first network interface to the second network interface;
- breaking the first bonded interface by decoupling the first SIM from the first network interface or the second SIM from the second network interface based on one or more performance metrics of the first network or the second network;
- establishing a third connection between the first network interface and a third network by coupling a third SIM of the plurality of SIMs to the first network interface; and
- generating a second bonded interface by recoupling the first network interface to the second network interface.

14. The method of claim 13, comprising coupling to a routing device, wherein the routing device is configured to provide a secure channel between one or more devices communicatively coupled to the routing device and the first network, the second network, or the third network, or any combination thereof.

15. The method of claim 14, wherein the secure channel comprises an encrypted virtual private network tunnel.

16. The method of claim 14, wherein coupling to the routing device occurs via a Peripheral Component Interconnect Express interface.

17. The method of claim 14, wherein coupling to the routing device occurs via a Universal Serial Bus interface.

18. Tangible, non-transitory, computer-readable media storing instructions that cause processing circuitry to:
- establish a first connection between a first network interface and a first network by coupling a first subscriber identification module (SIM) of a plurality of SIMs to the first network interface;
- establish a second connection between a second network interface and a second network by coupling a second SIM of the plurality of SIMs to the second network interface;
- generate a first bonded interface by coupling the first network interface to the second network interface;
- break the first bonded interface by decoupling the first SIM from the first network interface or the second SIM from the second network interface based on one or more performance metrics of the first network or the second network;
- establish a third connection between the first network interface and a third network by coupling a third SIM of the plurality of SIMs to the first network interface; and
- generate a second bonded interface by recoupling the first network interface to the second network interface.

19. The tangible, non-transitory, computer-readable media of claim 18, wherein the instructions cause the processing circuitry to break the first bonded interface based on determining that the third network comprises a higher quality of service (QOS) score compared to one or both of the first network and the second network.

20. The tangible, non-transitory, computer-readable media of claim 18, wherein the instructions cause the processing circuitry to:
- store first data received via the first network interface in a first buffer;
- store second data received via the second network interface in a second buffer; and
- generate the second bonded interface based on determining that the first data or the second data is sufficient to prevent data interruption associated with breaking the first bonded interface and generating the second bonded interface.

\* \* \* \* \*